(12) United States Patent
Draaisma et al.

(10) Patent No.: US 6,183,891 B1
(45) Date of Patent: Feb. 6, 2001

(54) MAGNETIC HEAD AND METHOD OF MANUFACTURE

(75) Inventors: Eeltje A. Draaisma; Franciscus A. Pronk, both of Eindhoven (NL)

(73) Assignee: Onstream, Inc., Loveland, CO (US)

( * ) Notice: Under 35 U.S.C. 154(b), the term of this patent shall be extended for 0 days.

(21) Appl. No.: 08/879,163

(22) Filed: Jun. 19, 1997

(30) Foreign Application Priority Data

Dec. 18, 1996 (EP) .................................................. 96203605

(51) Int. Cl.⁷ ........................................................ B32B 9/00
(52) U.S. Cl. ........................ 428/693; 427/130; 427/131; 427/132; 427/337; 427/367; 428/900
(58) Field of Search ..................................... 427/131, 132, 427/130, 337, 367; 428/692, 693

(56) References Cited

FOREIGN PATENT DOCUMENTS

0617409A2   9/1994 (EP) .

Primary Examiner—Bernard Pianalto

(74) Attorney, Agent, or Firm—Welsh & Katz, Ltd.

(57) ABSTRACT

Method of manufacturing a thin-film magnetic head comprising an inductive transducing system. A non-magnetic, insulating material for forming a first insulation layer (13), on which an inductive transducing element (15) is formed, is deposited on a plane basic surface (11). Subsequently, a non-magnetic, insulating material for forming a second insulation layer (19) is deposited on the first insulation layer and the inductive transducing element formed thereon. Subsequently, material is removed in an area proximate to a head face (30) to be formed for forming an aperture extending through the first and the second insulation layer and reaching as far as the basic surface, whereafter a non-magnetic, insulating material for forming a gap layer (29) is deposited in the aperture. Subsequently, a soft-magnetic material for forming a first soft-magnetic layer is deposited on the gap layer, whereafter the soft-magnetic layer (31), as well as adjoining, uncovered layer parts of deposited non-magnetic, insulating material are planarized to form a plane surface. Subsequently, a soft-magnetic material is deposited on this surface for forming a second soft-magnetic layer (35) which, jointly with the first soft-magnetic layer, constitutes a magnetic flux guide (36).

13 Claims, 14 Drawing Sheets

MAGNETIC HEAD AND METHOD OF MANUFACTURE

BACKGROUND OF THE INVENTION

The invention relates to a method of manufacturing a layered magnetic head having a head face and comprising an inductive transducing system, in which method a non-magnetic, insulating material is deposited for forming a first insulation layer on which an inductive transducing element is formed, whereafter a non-magnetic, insulating material for forming a second insulation layer is deposited on the first insulation layer and the inductive transducing element formed thereon, whereafter a magnetic flux guide bounding a nonmagnetic gap layer is formed, whereafter the head face is formed, whereby the flux guide and the gap layer terminate in the head face.

The invention also relates to a thin-film magnetic head having a head face and comprising an inductive transducing system.

A method and a magnetic head of this type are known from EP-A 0 617 409. For forming an inductive transducing system, the known method starts from a polished base of ferrite having a plane basic surface. A first insulation layer of quartz is provided on the basic surface by means of, for example PE CVD, which quartz insulation layer is subsequently provided with an electrically conducting layer. This layer is structured to form turns of an inductive element. Subsequently, quartz is deposited for forming a second insulation layer, and a through-connection aperture is etched in said two insulation layers in an area removed from a head face to be formed at a later stage. Subsequently, a relatively thick third quartz insulation layer is provided. The assembly of layers jointly constitutes a thick insulation layer of a non-magnetic material. A structured layer of a mask material is formed on this layer. With the structured layer as a mask, the thick insulation layer is subsequently sputter-etched for forming a recess which extends as far as the base via the through-connection aperture. After sputtering, the remaining parts of the structured layer are removed by wet-chemical etching. A soft-magnetic layer is provided on the structured thick insulation layer obtained, while the recess is filled. The soft-magnetic layer is used for forming a flux guide. The soft-magnetic layer and the adjoining thick insulation layer are polished for creating a plane surface. An insulation layer is provided on this surface, whereafter a magnetoresistive transducing system is formed.

A drawback of the known method is that the flux guide is formed on a non-planarized surface, so that parts of the flux guide will extend between turns of the inductive element, which has a detrimental influence on the efficiency of the inductive transducing system. Moreover, the known method does not allow any freedom of choice of the distance between the basic surface and the soft-magnetic layer, because the distance is entirely determined by the thickness of the insulation layers provided to form the gap length.

OBJECTS AND SUMMARY OF THE INVENTION

It is an object of the invention to provide a method of manufacturing a magnetic head comprising an efficient inductive transducing system.

A first aspect of the method according to the invention, in which a nonmagnetic, insulating material for forming a first insulation layer, on which an inductive transducing element is formed, is deposited on a plane basic surface, whereafter a nonmagnetic, insulating material for forming a second insulation layer is deposited on the first insulation layer and the inductive transducing element formed thereon, whereafter a magnetic flux guide bounding a non-magnetic gap layer adjoining the basic surface is formed, whereafter the head face is formed, whereby the flux guide and the gap layer terminate in the head face, is characterized in that, after the formation of the second insulation layer, material is removed in an area, in which the head face is formed, for forming an aperture extending through the first and the second insulation layer and reaching as far as the basic surface, whereafter a non-magnetic, insulating material for forming the gap layer is deposited in the aperture, and subsequently a soft-magnetic material for forming a first soft-magnetic layer is deposited on the gap layer, whereafter the first soft-magnetic layer is planarized to form a plane surface on which a soft-magnetic material is subsequently deposited for forming a second soft-magnetic layer which, jointly with the first soft-magnetic layer, constitutes the magnetic flux guide. When the first soft-magnetic layer is being planarized, adjoining layer parts of deposited non-magnetic insulating material are preferably planarized as well.

A second aspect of the method according to the invention, in which a non-magnetic, insulating material for forming a first insulation layer, on which an inductive transducing element is formed, is deposited on a plane basic surface, whereafter a nonmagnetic, insulating material for forming a second insulation layer is deposited on the first insulation layer and the inductive transducing element formed thereon, whereafter a magnetic flux guide bounding a non-magnetic gap layer is formed, whereafter the head face is formed, whereby the flux guide and the gap layer terminate in the head face, is characterized in that, after the formation of the second insulation layer, material is removed in an area, in which the head face is formed, for forming an aperture extending through the first and the second insulation layer and reaching as far as the basic surface, whereafter a soft-magnetic material for forming a first soft-magnetic layer is deposited in the aperture, whereafter the first soft-magnetic layer is planarized to form a plane surface on which a non-magnetic, insulating material is subsequently deposited for forming the gap layer, and subsequently a soft-magnetic material is deposited for forming a second soft-magnetic layer constituting the magnetic flux guide. When the first soft-magnetic layer is being planarized, adjoining layer parts of deposited non-magnetic insulating material are preferably planarized simultaneously.

A third aspect of the method according to the invention, in which a nonmagnetic, insulating material is deposited for forming a first insulation layer on which an inductive transducing element is formed, whereafter a non-magnetic, insulating material for forming a second insulation layer is deposited on the first insulation layer and the inductive transducing element formed thereon, whereafter a magnetic flux guide bounding a nonmagnetic gap layer is formed, whereafter the head face is formed, whereby the flux guide and the gap layer terminate in the head face, is characterized in that, prior to the formation of the first insulation layer, a soft-magnetic material is deposited on a basic surface in an area, in which the head face is formed, for forming a first soft-magnetic layer, whereafter a non-magnetic, insulating material is deposited on the first soft-magnetic layer and on adjoining parts of the basic surface for forming the first insulation layer, whereafter the inductive transducing element and the second insulation layer are consecutively formed, whereafter planarizing as far as the first soft-magnetic layer is effected to form a plane surface on which a non-magnetic, insulating material for forming the gap layer and a soft-magnetic material for forming a second soft-magnetic layer constituting the flux guide are consecutively deposited.

When using the method according to the invention, the flux guide is situated on a planarized surface extending parallel to the inductive transducing element, while the distance between this surface and the relevant transducing element can be chosen independently of a desired gap length formed by the gap layer. This means that a relatively large distance between the flux guide and the inductive transducing element desired for reasons of efficiency can be realized without any consequence for the gap length and without any extra measures. The gap length can be determined by structuring the first soft-magnetic layer when the method is being carried out.

An embodiment of the method according to the invention is characterized in that the flux guide, as well as adjoining layer parts of deposited non-magnetic, insulating material, are planarized to form a plane main surface on which subsequently a layer of a magnetoresistive transducing system is formed. A plane surface as a base for a magnetoresistive transducing element has a favorable influence on the stability of the relevant transducing element. For reasons of technology and/or efficiency, a writer first/sensor last combihead is preferred.

An embodiment of the method according to the invention is characterized in that the method starts from a plane substrate of a non-magnetic material on which a soft-magnetic material is deposited for forming a soft-magnetic basic layer, whereafter the basic layer, as well as adjoining layer parts of deposited non-magnetic, insulating material, are planarized to form the basic surface. Said basic layer functions as a flux-guiding element in the magnetic head obtained.

An alloy of, for example CoZrNb, FeNbSi, FeNbSiN, FeSiAl or NiFe may be used as a soft-magnetic material. $Al_2O_3$ or $SiO_2$ may be used, for example, as nonmagnetic, insulating materials. The materials may be deposited by means of known techniques such as electrodeposition, sputtering or vapor deposition.

An embodiment of the method according to the invention is characterized in that, prior to providing a soft-magnetic material on the substrate, a non-magnetic, insulating material for forming an insulating basic layer is deposited on the substrate, whereafter an aperture corresponding to the soft-magnetic basic layer to be formed and reaching as far as the substrate is formed in the insulating basic layer by removing material, whereafter the soft-magnetic basic layer is formed by depositing a soft-magnetic material in the relevant aperture, whereafter the soft-magnetic basic layer and the insulating basic layer are jointly planarized. Use of this method yields a basic surface having a suitable planeness. The gap width can be determined by structuring the soft-magnetic basic layer.

An embodiment of the method according to the invention is characterized in that, simultaneously with the removal of material from the first and the second insulation layer in an area proximate to the head face to be formed, material is removed from the first and the second insulation layer in an area remote from the head face to be formed, for forming a through-connection aperture extending as far as the basic surface, while, during the formation of the first soft-magnetic layer, a soft-magnetic material is deposited in the through-connection aperture for forming a soft-magnetic through-connection between the basic surface and the flux guide to be formed. Without extra steps being required, this method provides the possibility of forming a magnetic yoke.

An embodiment of the method according to the invention is characterized in that planarizing is effected by means of mechanochemical polishing. Mechanochemical polishing may take place on both soft-magnetic and non-magnetic material. It has been found that a very smooth and plane surface is obtained, even if soft-magnetic material and adjoining non-magnetic material are simultaneously polished mechanochemically. Mechanochemical polishing is performed with a work face of a polishing tool which is pressed both against and displaced across the surface to be polished. The work face is provided with a fluid mechanochemical polishing agent which polishes both chemically and mechanically. In the mechanochemical polishing method, in which mechanically removed components of the surface to be polished are chemically dissolved, a very smooth, plane and undamaged polished surface is obtained. If one of the components to be polished is very hard, the mechanical aspect of the mechanochemical polishing method may be reinforced by adding a small quantity of hard grains to the polishing agent, so that a smooth, plane and undamaged surface is also realized when using very hard materials. Further details relating to mechanical polishing are described in EP-A 0 617 409.

A thin-film magnetic head according to the invention, which is obtainable by means of the method according to the invention, has a head face and comprises an inductive transducing system which is provided with an inductive transducing element embedded in an insulation layer present on a plane basic surface, and is provided with a flux guide which is present on the insulation layer and has an end part adjoining the head face, which end part comprises two soft-magnetic layers situated on top of each other and, jointly with the plane basic surface, bounds a non-magnetic gap layer.

A further thin-film magnetic head according to the invention, which is obtainable by means of the method according to the invention, has a head face and comprises an inductive transducing system which is provided with an inductive transducing element embedded in an insulation layer present on a plane basic surface, and is provided with a plane flux guide which is present on the insulation layer and terminates in the head face, which flux guide, jointly with a soft-magnetic layer present on the basic surface, bounds a non-magnetic gap layer.

The magnetic heads according to the invention have a high output, on the one hand, and an accurately defined transducing gap, on the other hand, in which the gap length is independent of the thickness of the insulation layers, which enclose the turns of the inductive transducing elements.

An embodiment of a magnetic head according to the invention comprises a non-magnetic substrate provided with a soft-magnetic basic layer having the plane basic surface. The basic layer, which is formed from a soft-magnetic material, serves as a flux-guiding element. The non-magnetic substrate is constituted by a non-magnetic material such as $Al_2O_3/TiC$ or silicon.

An embodiment of a magnetic head according to the invention comprises a magnetoresistive transducing system, in which the flux guide has a plane main surface on a side remote from the inductive transducing element, while a layer of the magnetoresistive transducing system is present on said plane main surface. The plane main surface contributes to the stability of the magnetoresistive transducing system. Notably, the plane main surface inhibits nucleation of domain walls and/or formation of small magnetic areas and/or sudden changes of magnetization in the magnetoresistive transducing element of the relevant system. Suitable embodiments of the magnetic head according to the invention are sensor-in-gap types and yoke-type versions.

It will be evident from the foregoing that a magnetic head according to the invention may be an inductive magnetic head or a combined inductive/magnetoresistive magnetic head. The magnetic head according to the invention is applicable, both as a write head or read head and as a write/read head in a video, audio, data or multimedia system. The magnetic head may cooperate with a disc-shaped or tape-shaped magnetic medium such as a magnetic disc or a magnetic tape, respectively. The invention therefore also relates to a device for storing information in and/or reading information from a magnetic information or recording medium, using a magnetic head according to the invention, with means being present for displacing the magnetic head relative to the information or recording medium.

These and other aspects of the invention are apparent from and will be elucidated with reference to the embodiments described hereinafter.

BRIEF DESCRIPTION OF THE DRAWINGS

In the drawings:

FIGS. 1, 2, 3, 4, 5, 6, 7, 8, 9, 10, 11, 12, 13, and 14 represent various steps of a first embodiment of the method according to the invention, in which FIG. 14 shows a first embodiment of the thin-film magnetic head according to the invention, manufactured in accordance with the first embodiment of the method according to the invention, FIGS. 15 and 16 represent alternative steps of the first embodiment of the method according to the invention, in which FIG. 16 shows a second embodiment of the magnetic head according to the invention, manufactured in accordance with the first embodiment of the method according to the invention, FIGS. 17, 18, 19, 20, 21, 22, 23, 24, 25, 26, represent various steps of a second embodiment of the method according to the invention, in which FIG. 27 shows an embodiment of a magnetic head according to the invention, manufactured in accordance with the second embodiment of the method according to the invention, FIGS. 28, 29, 30, 31, 32, 33, 34, 35, 36 and represent various steps of a third embodiment of the method according to the invention, in which

DESCRIPTION OF THE PREFERRED EMBODIMENTS

Figure 1:
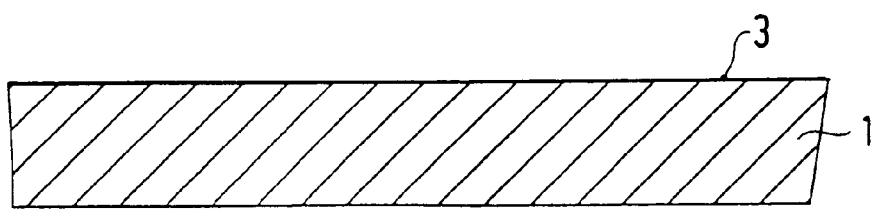
Figure 2:
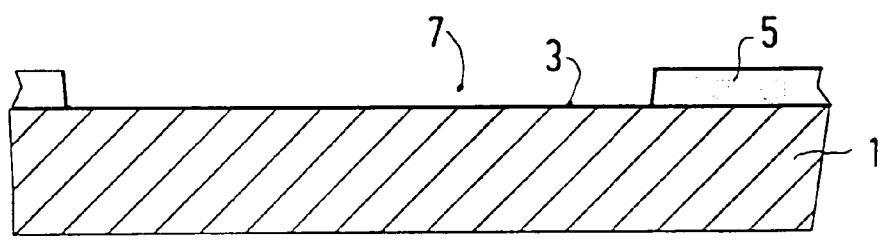
Figure 3:
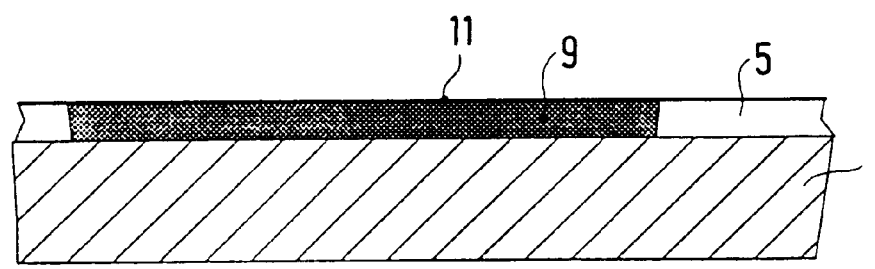
Figure 4:
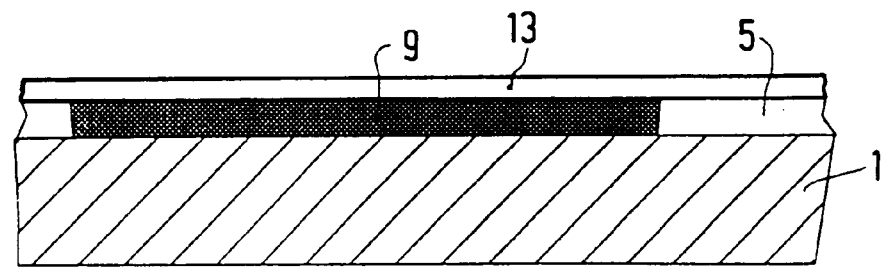
Figure 5:
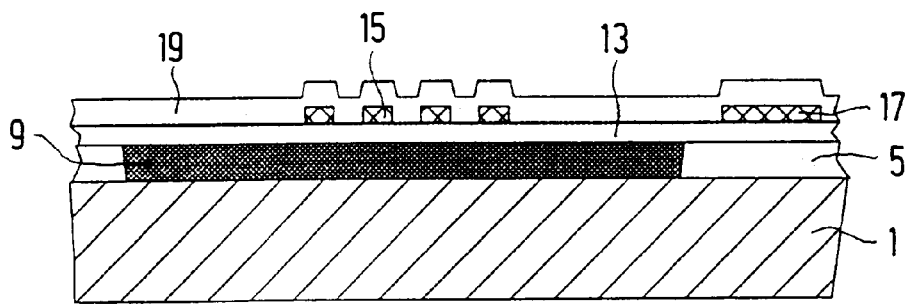
Figure 6:
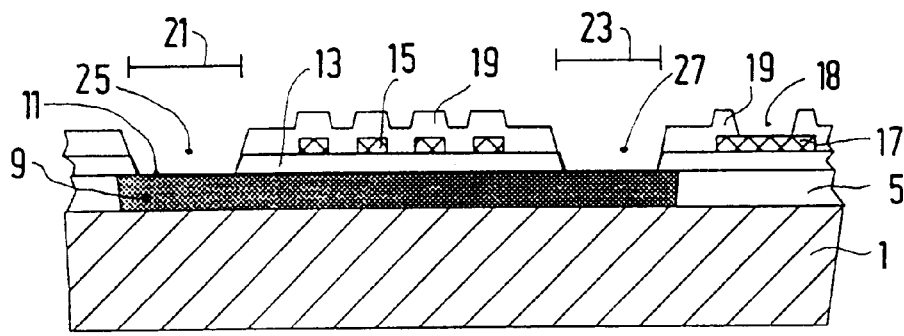
Figure 7:
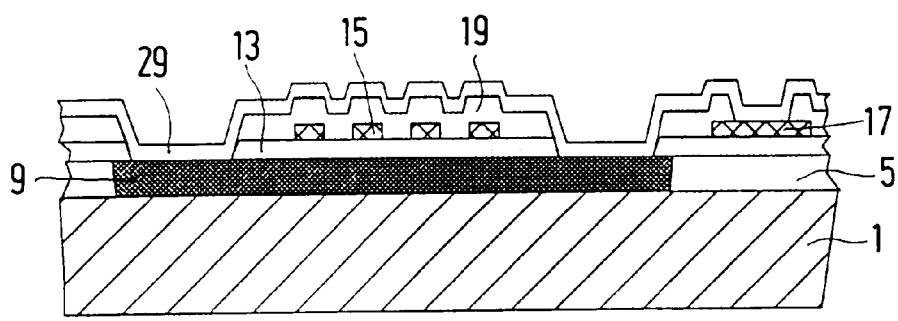
Figure 8:
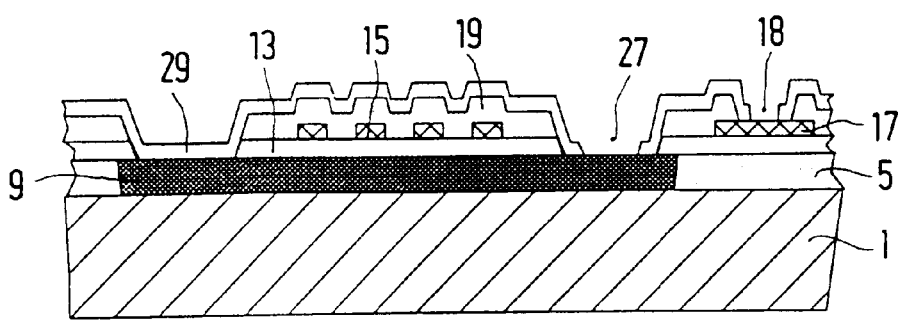
Figure 9:
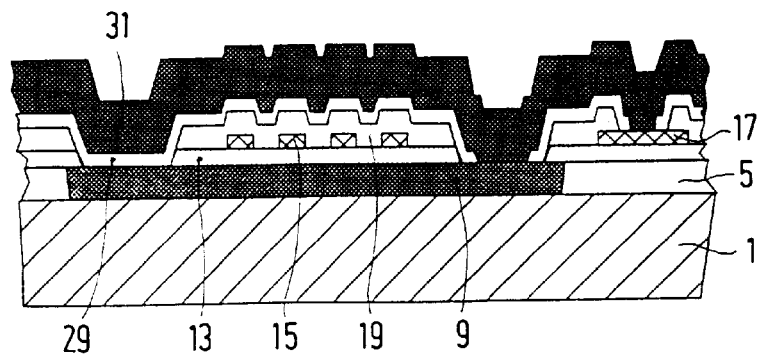
Figure 10:
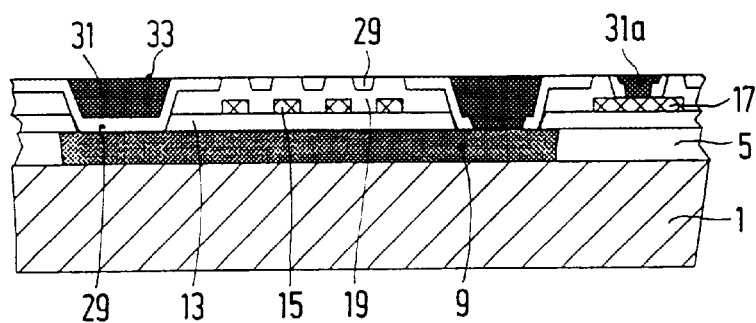
Figure 11:
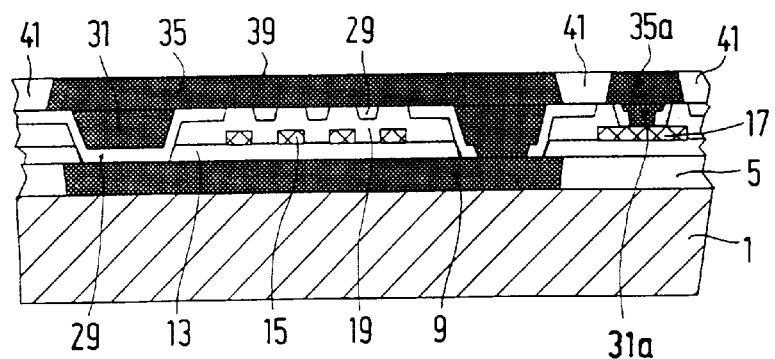
Figure 12:
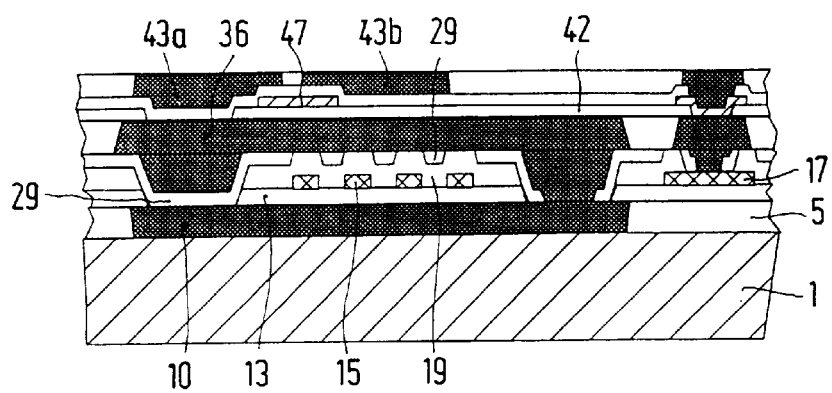
Figure 13:
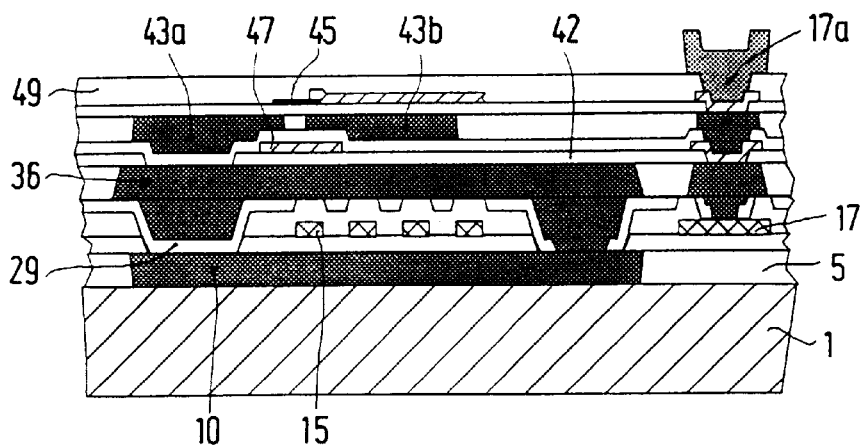

A first embodiment of the method according to the invention will now be described with reference to FIGS. 1 to 14. This embodiment starts from a non-magnetic plate-shaped substrate 1 of, for example silicon or $Al_2O_3$/TiC. A non-magnetic insulating material such as $SiO_2$ or $Al_2O_3$ is deposited on a face 3 of the substrate 1, for example, by means of sputtering, vapor deposition or PE CVD, for forming an insulating basic layer 5. An aperture 7 is formed in this basic layer 5 by removing material, for example, by means of etching such as wet-etching, sputter-etching or dry-chemical etching. A soft-magnetic basic layer 9 is formed in the aperture 7 by means of deposition, for example, electrodeposition or sputter deposition, of a soft-magnetic material such as NiFe, FeNbSi, CoZrNb or FeSiAl. The soft-magnetic basic layer 9, as well as remaining, adjoining parts of the insulating basic layer 5 are planarized by means of polishing, particularly mechanochemical polishing, to form a plane basic surface 11. A non-magnetic insulating material such as $SiO_2$ or $Al_2O_3$ is deposited on the basic surface 11 for forming a first insulation layer 13. An inductive transducing element 15, which is provided with one or more turn sections, is formed on the first insulation layer 13, for example, by means of sputter deposition of copper or gold. In this embodiment, an electric connection element 17 is formed simultaneously. The transducing element 15 is subsequently coated with a second insulation layer 19 which is formed by deposition of a non-magnetic, insulating material such as $SiO_2$ or $Al_2O_3$. In this embodiment, the electric connection element 17 is also coated. After the formation of the second insulation layer 19, which is partly present directly on the first insulation layer 13, material is removed in a first area 21, in which a head face 20 is formed at a later stage of the method, and in a second area 23 spaced apart from the head face 20 to be formed, which material is notably removed by means of etching for forming apertures 25 and 27 extending through the second insulation layer 19 and the first insulation layer 13 and each reaching as far as the basic surface 11. During etching, a further aperture 18 extending as far as the connection element 17 is also formed in this embodiment. A non-magnetic, insulating material such as $SiO_2$ or $Al_2O_3$ is deposited in the apertures 25, 27 and 18, while a gap layer 29 is formed. A part of the layer 29 present in the aperture 27, further referred to as through-connection aperture 27, and, in this embodiment, a part of the layer 29 present in the aperture 18 are removed by means of, for example, etching. Subsequently, a soft-magnetic material, for example, one of the afore-mentioned soft-magnetic materials, is deposited for forming a first soft-magnetic layer 31 which is directly magnetically connected to the soft-magnetic basic layer 9 via the through-connection aperture 27. In this embodiment, the electrically conducting layer 31 is also in direct contact with the connection element 17. The first soft-magnetic layer 31 is planarized, preferably by means of mechanochemical polishing, while material is removed as far as layer parts of deposited nonmagnetic, insulating material, particularly parts of the layers 19 and 29, adjoining the first soft-magnetic layer 31. During the planarizing operation, a first layer part 31a of the first soft-magnetic layer 31, which is in direct contact with the connection element 17, is separated from the rest of the layer 31 in this embodiment. After planarization, a plane surface 33 is obtained on which subsequently a soft-magnetic material, for example, one of the afore-mentioned soft-magnetic materials is deposited for forming a second soft-magnetic layer 35. The first and second soft-magnetic layers 31 And 35 jointly constitute a magnetic flux guide 36 which, in this embodiment, is in direct magnetic contact with the basic layer 9 functioning as a flux-guiding element 10. In this embodiment, a layer part 35a of the second soft-magnetic layer 35 provided on the first layer part 31a is separated by means of etching.

For obtaining a plane main surface 39, the second soft-magnetic layer 35 is planarized, preferably together with adjoining layer parts of deposited non-magnetic, insulating material such as the layer parts 41, preferably by means of mechanochemical polishing. Mechanochemical polishing may be carried out, for example, with the aid of a colloidal suspension of $SiO_2$ particles in a KOH or NaOH solution to which diamond particles having an average particle size of less than 1 μm are added, the concentration of diamond particles in said solution being smaller than 1 g per liter.

A layer 42, in this embodiment an insulating layer, of a magnetoresistive transducing system is formed on the main surface 39 by means of material deposition. This magnetoresistive transducing system also comprises the flux guide 36 constituted by the first and second soft-magnetic layers 31 and 39, as well as a shared flux guide 43a, 43b and a magnetoresistive transducing element 45. In this embodiment, the magnetoresistive transducing system further has a bias winding 47. The shared flux guide 43a, 43b, the magnetoresistive element 45 and the bias winding 47 are formed by means of known thin-film techniques, with suitably insulating layers being present in known manner. As a last layer, an insulating end layer 49 of, for example, silicon oxide or aluminum oxide may be provided. After planarization of the layer 49, a connection face 17a connected to the connection element 17 via a number of electric through-connections, as well as a protective (or counter) block 51 are provided. Subsequently, the head face 20 is formed in known manner such as by grinding and/or polishing.

Figure 14:
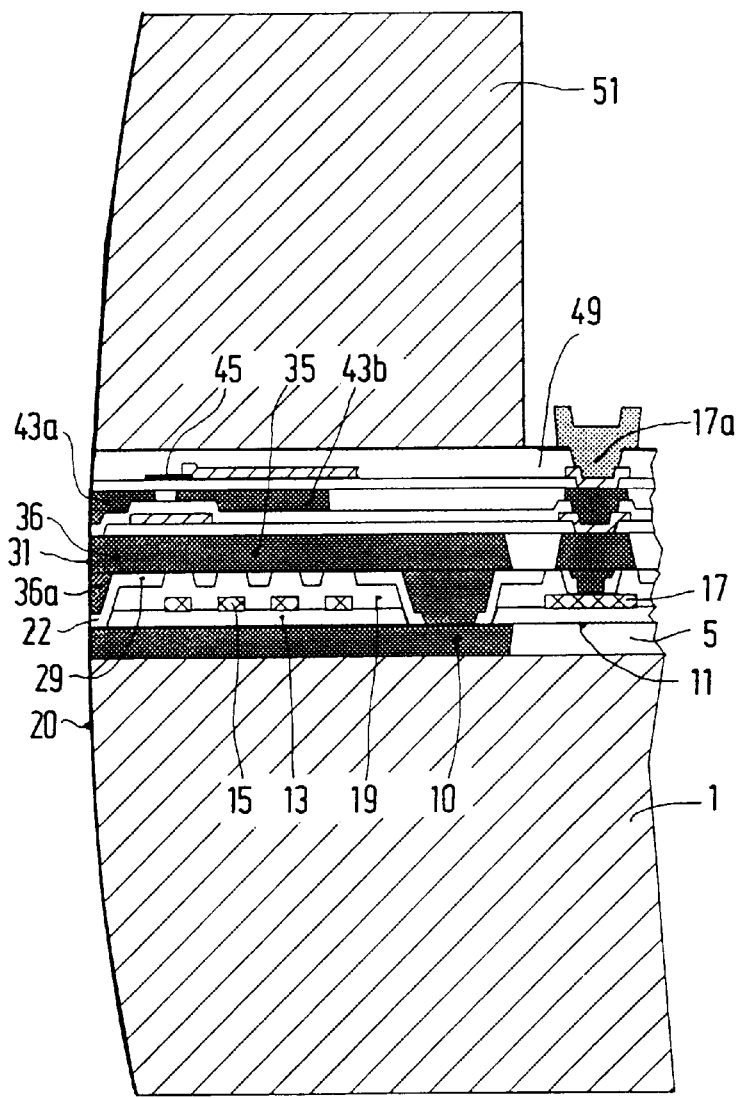

The magnetic head according to the invention, shown in FIG. 14, has the head face 20 and comprises the non-magnetic substrate 5 which is provided with a thin-film structure comprising the flux-guiding element 10, the inductive transducing element 15, a non-magnetic transducing gap 22 constituted by the gap layer 29, the flux guide 36, which is provided with a plug element 36a, with the transducing gap 22 being present between the flux-guiding element 10 and the plug element 36a, the shared flux guide 43a, 43b and the magnetoresistive transducing element 45, with the flux guide 36 functioning as a shared pole. This magnetic head is preferably used for inductively writing information in a recording medium and for magnetoresistively reading information from a recording medium.

Figure 15:
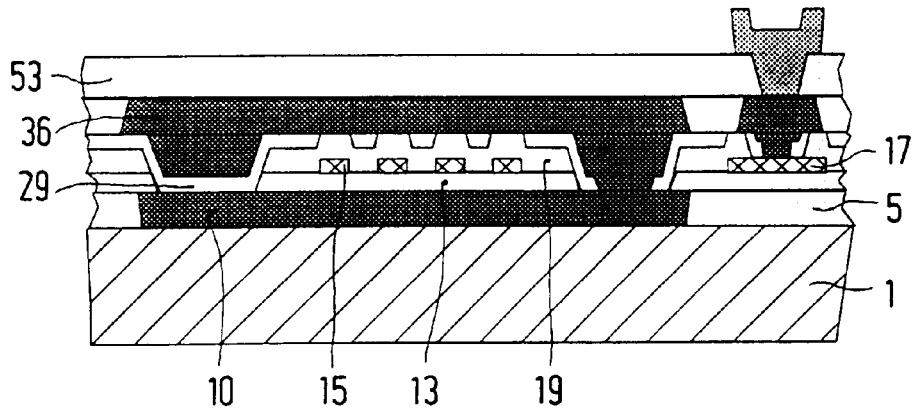
Figure 16:
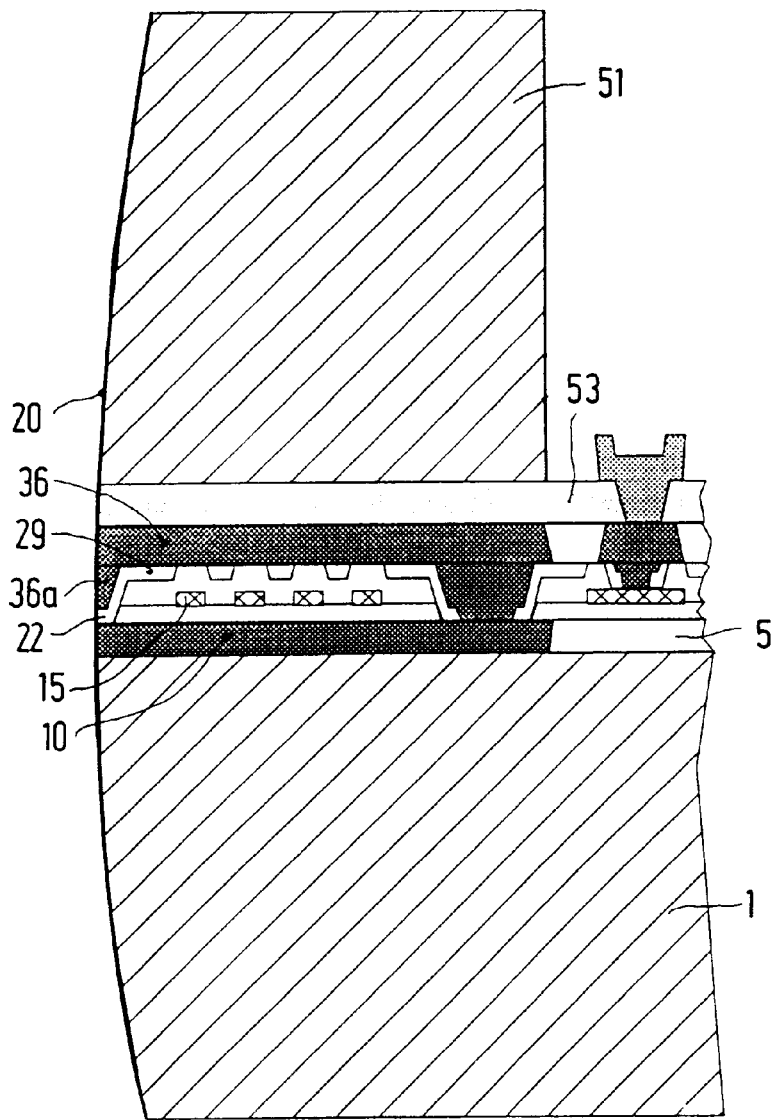
Figure 17:
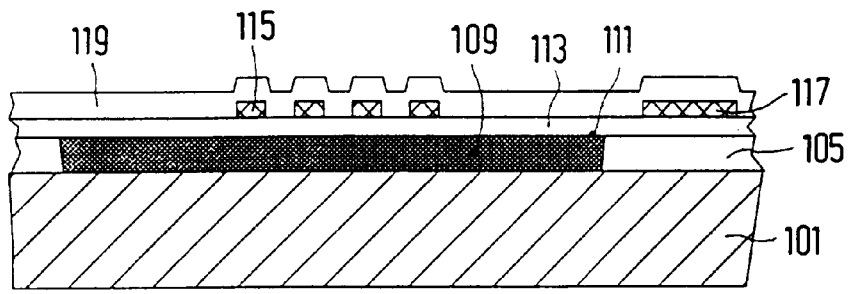
Figure 18:
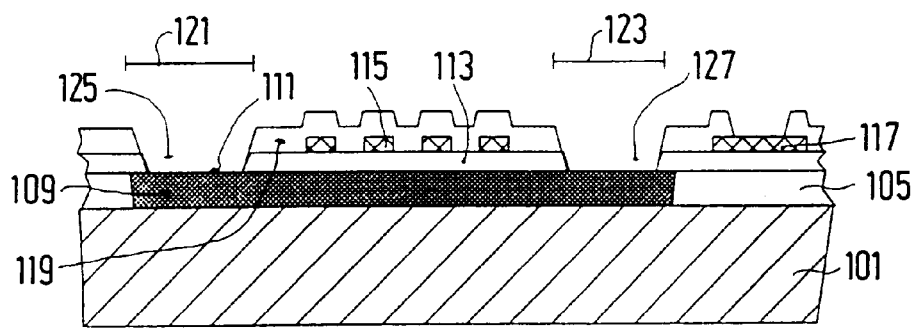
Figure 19:
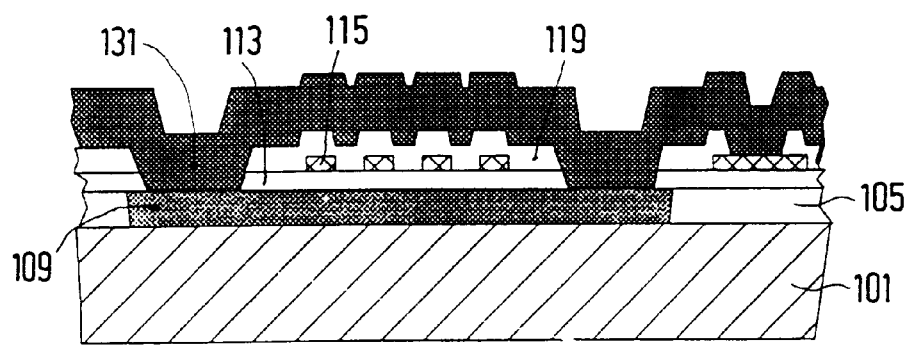
Figure 20:
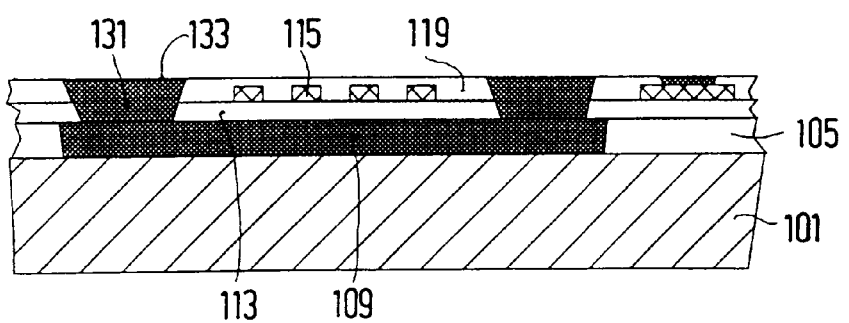
Figure 21:
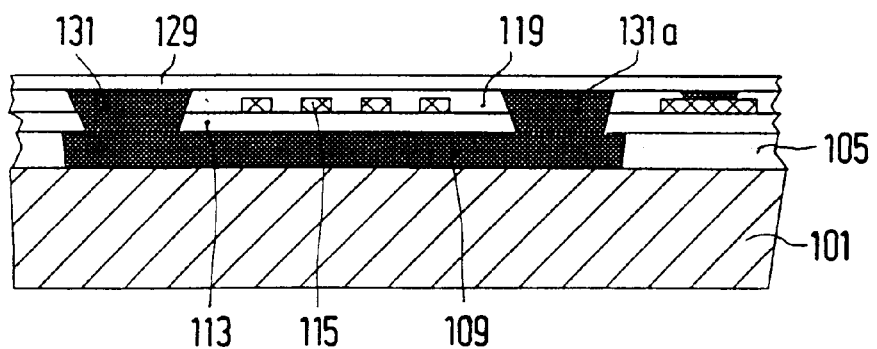
Figure 22:
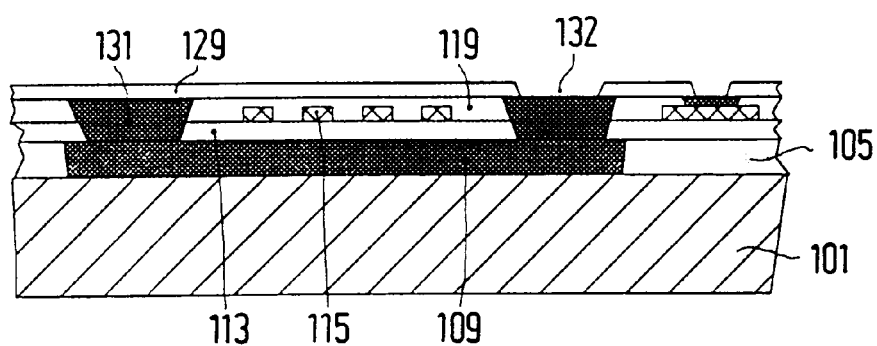
Figure 23:
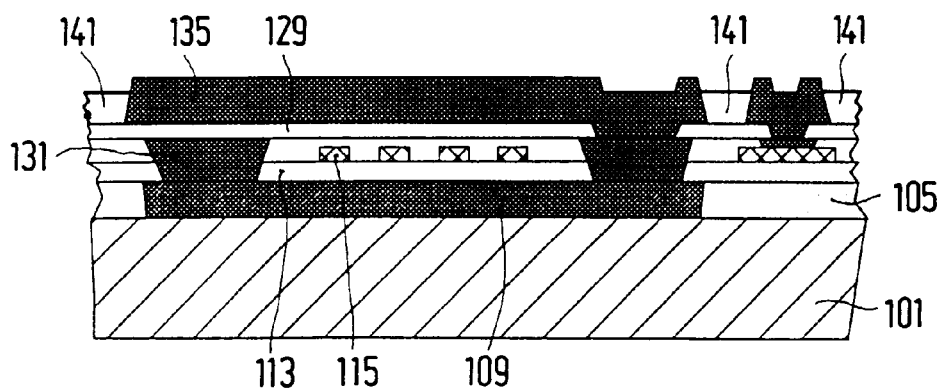
Figure 24:
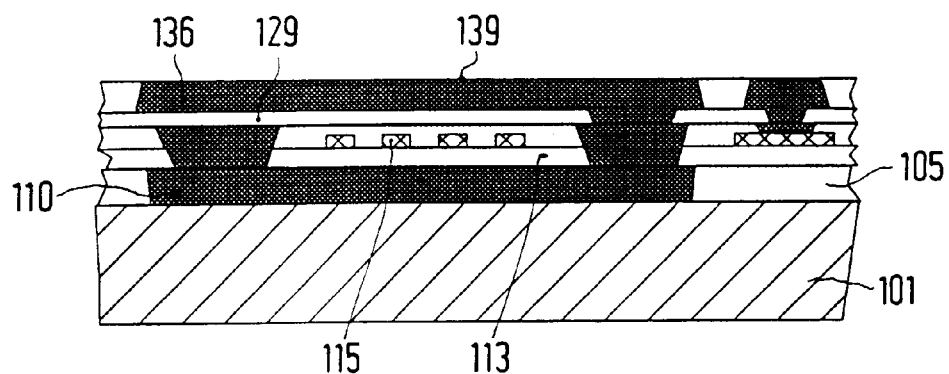
Figure 25:
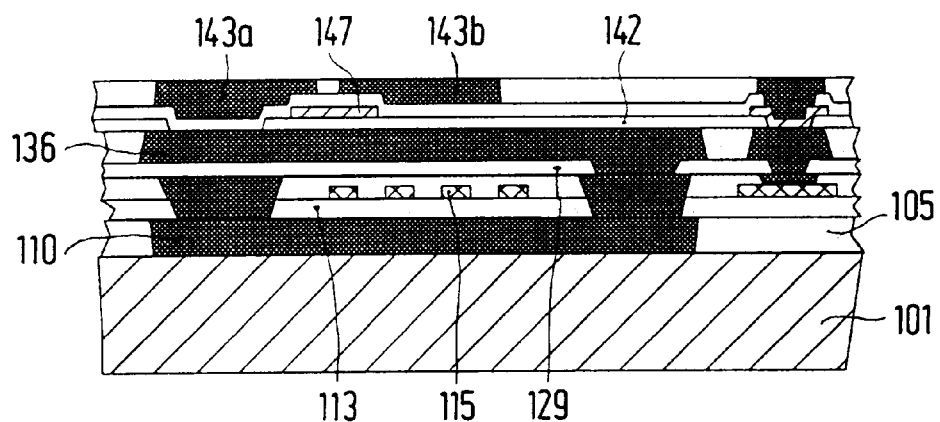
Figure 26:
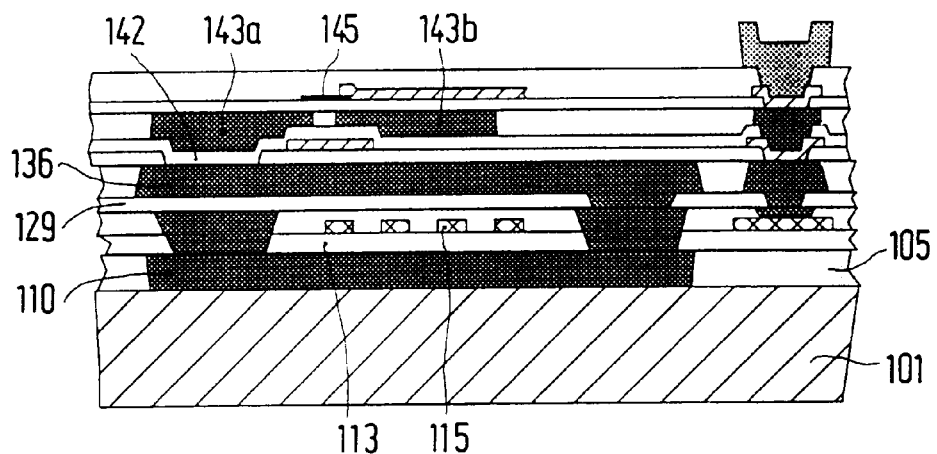

Instead of forming a magnetoresistive structure on the main surface 39, the thin-film structure resulting from the method, in so far as is represented in FIGS. 1 to 11, may be further processed to form an inductive read and/or write head. An example of such a head is shown in FIGS. 15 and 16. In this example, an intermediate layer 53 of a nonmagnetic material is formed on the main surface 39 onto which subsequently the counter block 51 is glued, whereafter the head face 20 is formed.

In a practical embodiment, the method according to the invention will be carried out in a multiple version, forming a wafer of magnetic head structures.

A second embodiment of the method according to the invention will now be described with reference to FIGS. 17 to 27. Here, a method is concerned which also relates to the manufacture of a layered magnetic head, particularly a thin-film magnetic head, in which method a non-magnetic, insulating material for forming a first insulation layer 113 is deposited on a plane basic surface 111. For forming the basic surface 111, it is possible to start from a plane substrate 101 of a non-magnetic material on which a soft-magnetic material is deposited for forming a soft-magnetic basic layer 109. Prior to the deposition of soft-magnetic material, a non-magnetic, insulating material is preferably deposited on the substrate 101 for forming an insulating basic layer 105. In that case, an aperture extending as far as the substrate 101 is formed by removing material from the insulating basic layer 105, in which aperture the soft-magnetic material is subsequently deposited for forming the soft-magnetic basic layer 109. The soft-magnetic basic layer 109 is planarized or, if the insulating basic layer 105 is present, the soft-magnetic basic layer 109 and adjoining parts of the insulating basic layer 105 are jointly planarized for forming the plane basic surface 111. An inductive transducing element 115 having one or more turns is formed on the formed first insulation layer 113 by depositing an electrically conducting material. An electric connection element 117 may be formed simultaneously with the formation of the transducing element 115. Subsequently, a non-magnetic, insulating material for forming a second insulation layer 119 is deposited on the first insulation layer provided with the transducing element 115 and the connection element 117, if present, whereafter an aperture 125 extending through the first insulation layer 113 and the second insulation layer 119 is formed by removing material in an area 121 in which a head face 120 will be formed, the aperture 125 extending as far as the basic surface 111. Simultaneously with the formation of the aperture 125, a through-connection aperture 127 extending as far as the basic surface 111 can be formed in an area 123 spaced apart from the area 121. A soft-magnetic material for forming a first soft-magnetic layer 131 is deposited in the aperture 125 as well as in the through-connection aperture 123 in this embodiment. The first soft-magnetic layer formed is planarized for forming a plane surface 133 on which subsequently a non-magnetic, insulating material is deposited for forming a gap layer 129. In this embodiment, an aperture 132 extending as far as a layer part 131a of the first soft-magnetic layer 131 is formed in the area 123 by removing material. Subsequently, a soft-magnetic material is deposited for forming a second soft-magnetic layer 135 which constitutes a magnetic flux guide 136 which, in this embodiment, is in direct magnetic contact with the soft-magnetic basic layer 109 functioning as a flux-guiding element 110. For the purpose of further process steps, the second soft-magnetic layer 135 is planarized, preferably simultaneously with adjoining layer parts such as the layer parts 141 of deposited non-magnetic, insulating material, so as to form a plane main surface 139. The materials and methods of depositing and removing materials used in this embodiment may correspond to the materials and methods used in the embodiments described hereinbefore.

Similarly as in the first embodiment, this method may result in an inductive magnetic head or in a combined inductive/magnetoresistive magnetic head. The last-mentioned possibility is further elaborated in this embodiment. An insulating layer 142, a bias winding 147, a shared flux guide 143a, 143b and a magnetoresistive element 145 are consecutively provided on the main surface 139 by using a thin-film technique, while insulation layers are also provided between various layers. After a protective block 151 has been provided, the structure thus obtained is provided with the head face 120 by means of a mechanical processing method, with which the magnetic head according to the invention, shown in FIG. 27, is obtained.

Figure 27:
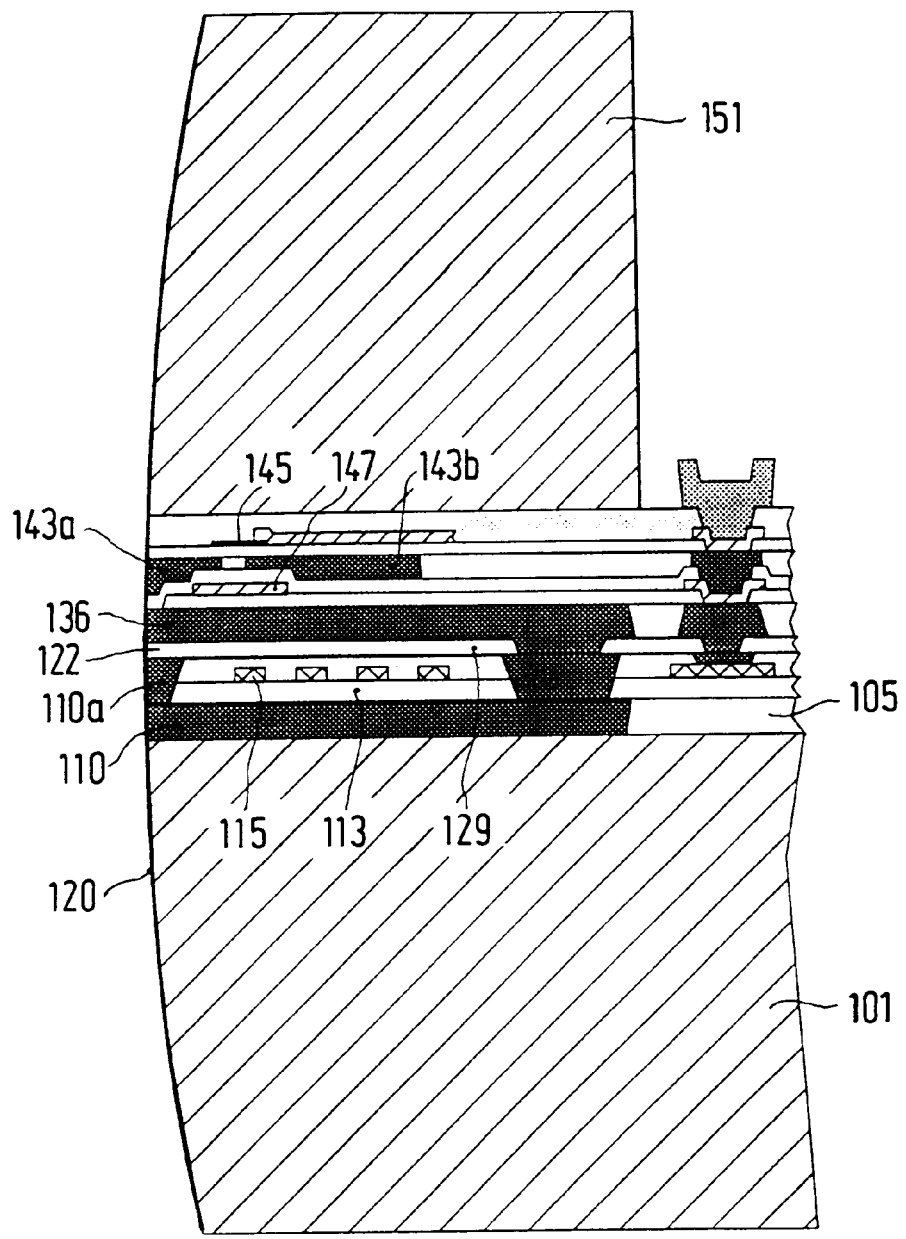
Figure 28:
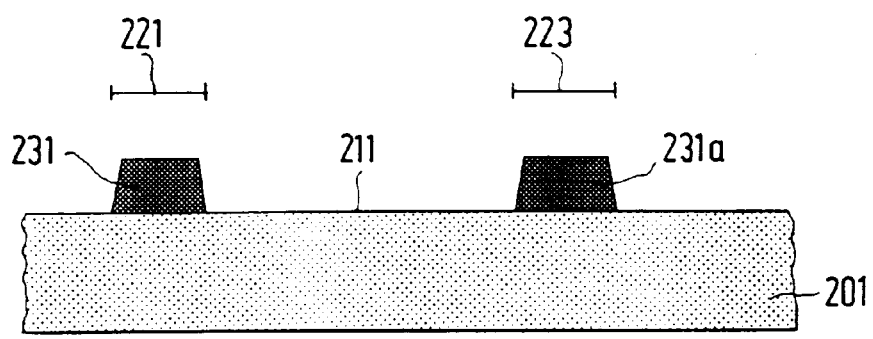
Figure 29:
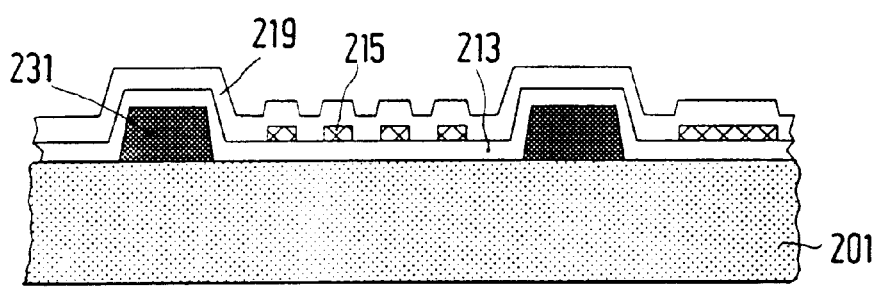
Figure 30:
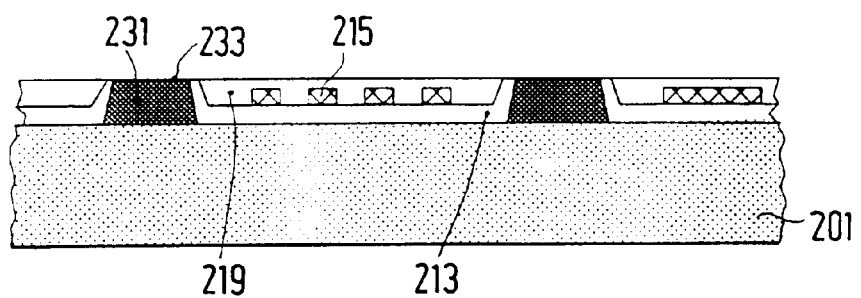
Figure 31:
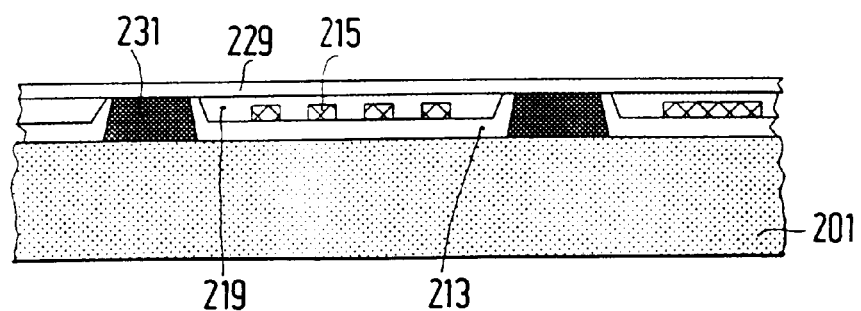
Figure 32:
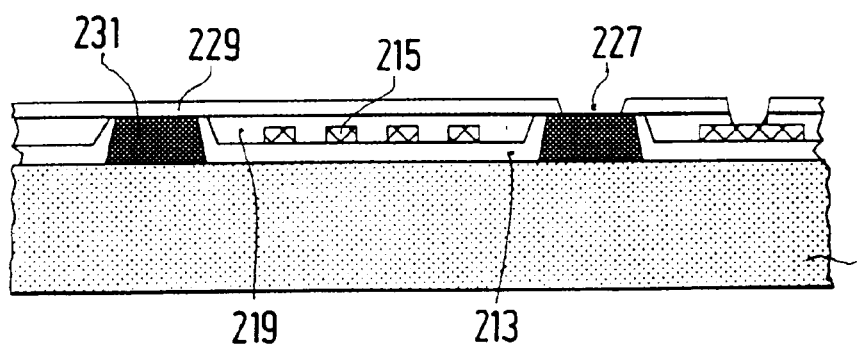
Figure 33:
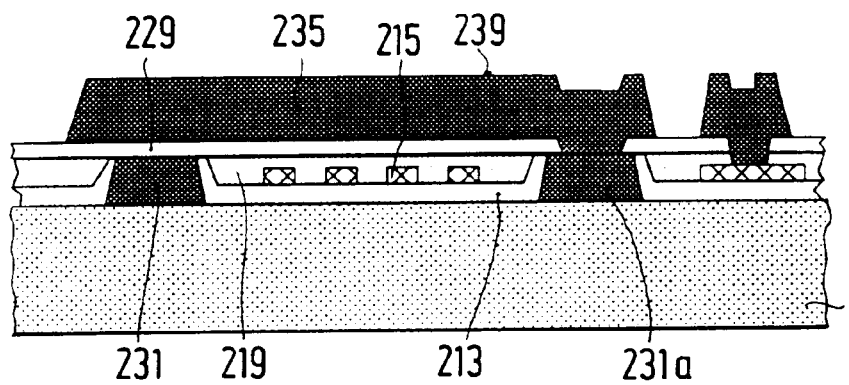
Figure 34:
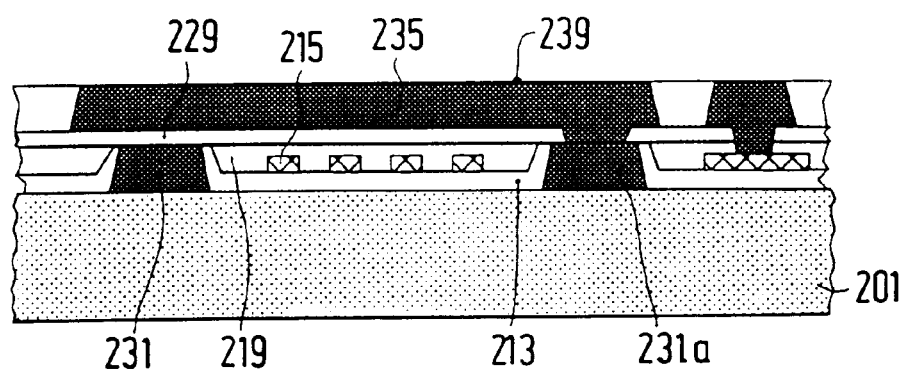
Figure 35:
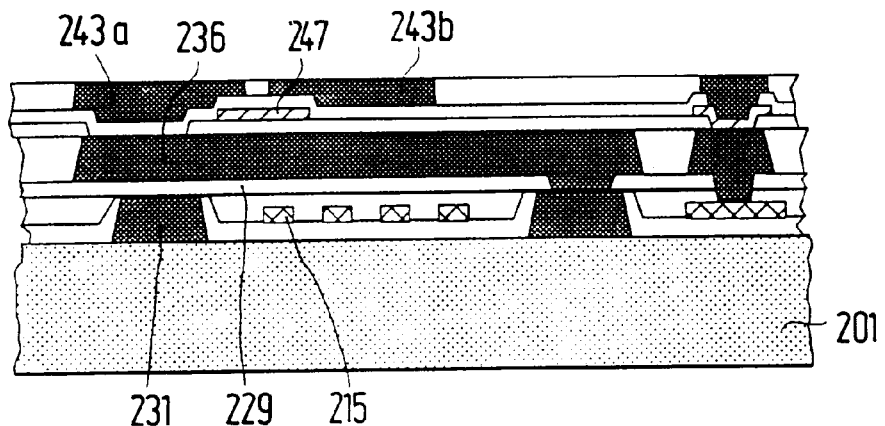
Figure 36:
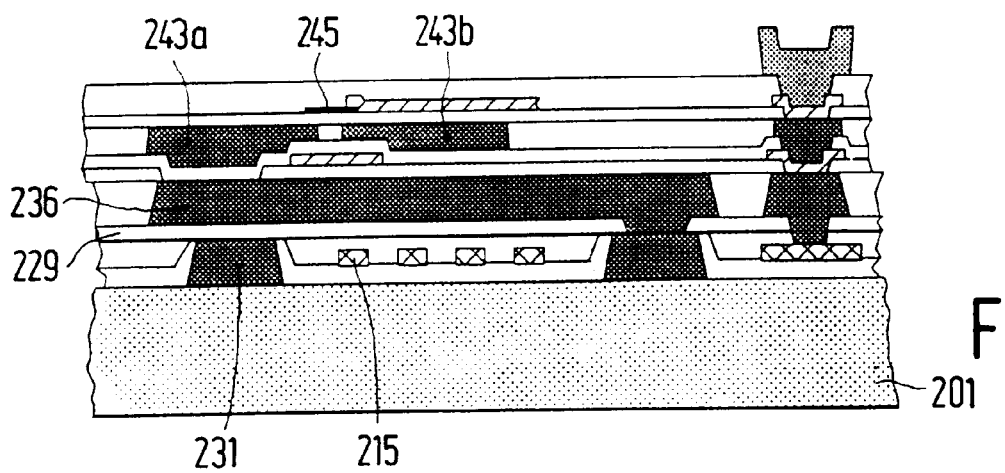

The thin-film magnetic head shown in FIG. 27 has the head face 120 and comprises the substrate 105, the flux-guiding element 110 provided with a plug element 110a, the inductive transducing element 115, the flux guide 136 and a non-magnetic transducing gap 122 constituted by the gap layer 129 and bounded by the flux guide 136 and the plug element 110a. The magnetic head shown also comprises the shared flux guide 143a, 143b and the magnetoresistive element 145.

A third embodiment of the method according to the invention will now be described with reference to FIGS. 28 to 37. This embodiment starts, by way of example, from a plane substrate 201 of a magnetic material such as a ferrite, for example NiZn ferrite, which is provided with a plane basic surface 211. A soft-magnetic material is deposited in an area 221 on the basic surface 211, in which area a head face 220 is formed during the further process steps of the method for forming a first soft-magnetic layer 231 which, in this embodiment, is thus in direct magnetic contact with the substrate 201 which also constitutes a flux-guiding element 210. Simultaneously with the formation of the first soft-magnetic layer 231, a soft-magnetic layer part 231a is formed in this embodiment, also by means of deposition, in an area 223 which is spaced apart from the area 221. A non-magnetic, insulating material for forming a first insulation layer 213 is deposited on the formed first soft-magnetic layer 231, as well as on the layer part 231a and on adjoining uncovered parts of the substrate 201, on which first insulation layer an inductive transducing element 215 is formed by depositing an electrically conducting material, whereafter a second insulation layer 219 is formed by depositing a non-magnetic, insulating material. Subsequently, the structure thus obtained is planarized by means of a polishing process, preferably a mechanochemical polishing process, for obtaining a plane surface 233. A gap layer 229 is formed on this surface 233 by depositing a non-magnetic, insulating material. In this embodiment, a through-connection aperture 227 is provided by removing material in the area 223. Subsequently, a soft-magnetic material is deposited for forming a second soft-magnetic layer 235 for forming a flux guide 236 which, in this embodiment, is in direct magnetic contact with the flux-guiding element 210. In so far as they have not been described in greater detail in this embodiment, the materials and methods used correspond to the materials and methods used in the other embodiments.

Figure 37:
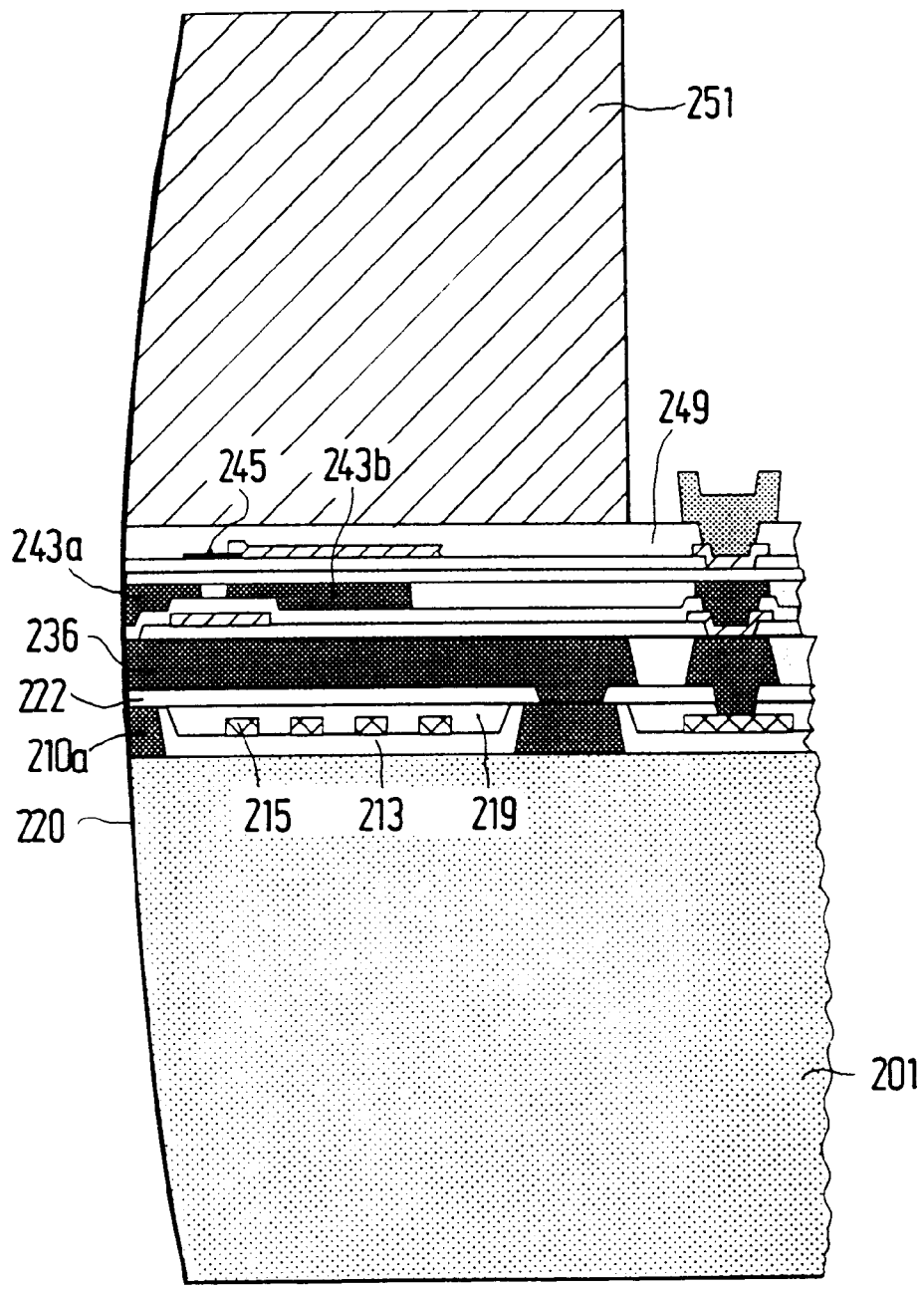
FIG. 37 shows an embodiment of a magnetic head according to the invention, manufactured in accordance with the third embodiment of the method according to the invention.

By forming a magnetoresistive structure on the flux guide 236, a magnetic head having an inductive portion and a magnetoresistive portion can be obtained. To this end, a magnetoresistive structure is formed by means of known thin-film techniques in this embodiment, after the soft-magnetic layer 235 and possibly adjoining layers of insulating material have been polished, whereby a smooth main surface 239 is obtained. This structure not only comprises the required non-magnetic, insulating layers, but also a shared flux guide 243a, 243b and a magnetoresistive element 245, with the flux guide 210 forming part of both the inductive and the magnetoresistive portion. The magnetic head shown in FIG. 37 is obtained after a protective block 251 has been provided and a head face 220 has been formed. This magnetic head has a non-magnetic transducing gap 222 which is constituted by the gap layer 229 and bounded by the flux guide 236 and a plug element 210a of the flux-guiding element 210.

The invention is not limited to the magnetic heads shown. The measures used may be successfully used in various types of single-channel and multichannel magnetic heads, particularly read heads, write heads and read/write heads for cooperation with magnetic record carriers. The magnetic heads may be alternatively used as sensors.

Figure 38:
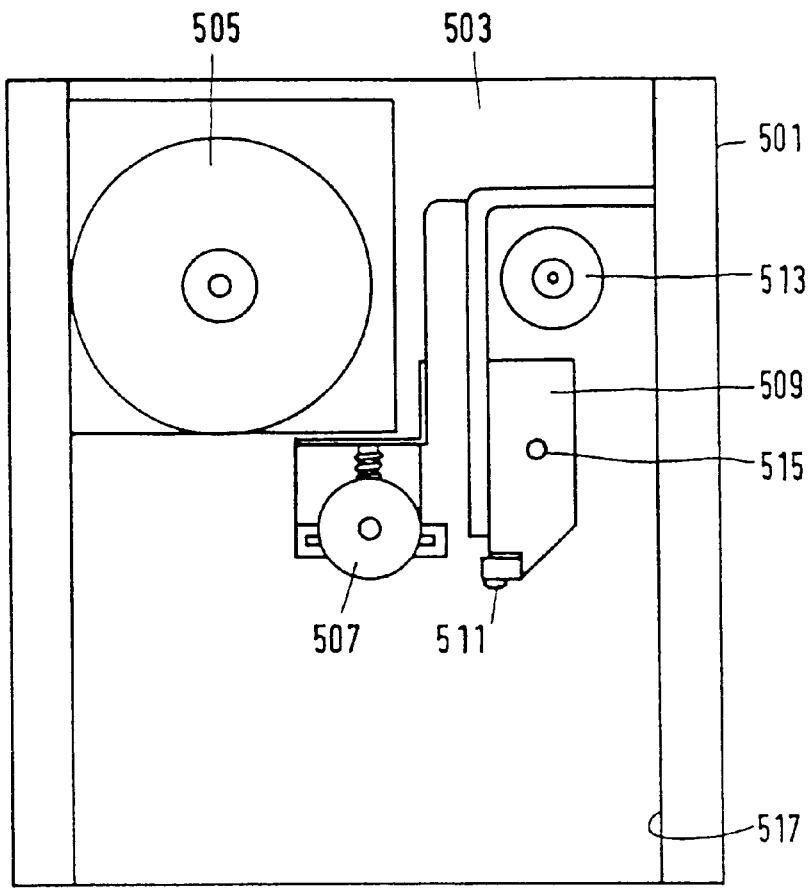
FIG. 38 shows diagrammatically an embodiment of the device according to the invention.
Figure 39:
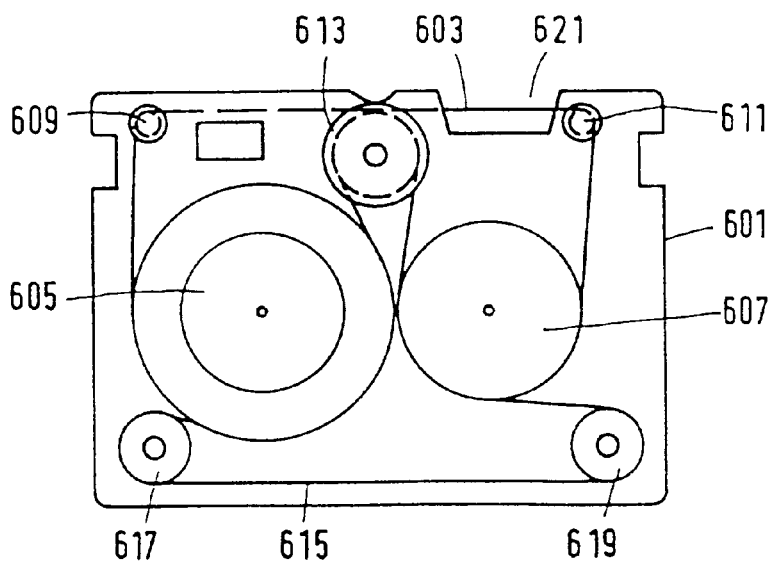
FIG. 39 shows an embodiment of a magnetic tape cassette suitable for cooperation with the shown embodiment of the device according to the invention.

The device according to the invention, shown in FIG. 38, is suitable for writing and/or reading a magnetic tape 603 which, in this embodiment, is present in the cassette 601 shown in FIG. 39. The device has a housing 501 with a frame 503. The housing 501 accommodates, inter alia, a drive motor 505 for driving a drive roll 507 and a magnetic head 511 according to the invention, particularly a multi-channel head, which is secured in this embodiment to a sub-frame 509 which is movable along a guide shaft 515 by means of a drive motor 513. The device further includes a straight guiding member 517 for moving the cassette 601 into and out of the housing 501. The cassette 601 may be used, for example, for recording information in a digital form. The cassette has two reels 605 and 607 on which a part of the magnetic tape 603 is present. The part of the magnetic tape 603 present between the two reels is guided across two tape-guiding members 609 and 611 which are stationary in this example, and moves along a capstan 613. An endless drive belt 615 which is guided along the capstan 613, the reels 605 and 607 and two belt-guiding members 617 and 619 is present in the cassette 601. In an operating state, in which the cassette 601 cooperates with the device 501 according to the invention, the magnetic head 511 engages a recess 621 in the cassette and is then in contact with the magnetic tape 603. Simultaneously, the drive roll 507 is in contact with the capstan 613 via which the magnetic tape 603 is longitudinally movable from one to the other reel.

Although the device shown is, in principle, a data storage device, the device according to the invention is not limited thereto. The device may be alternatively an audio and/or video device. The device may also be adapted to be such that the information medium is not a magnetic tape, but a magnetic disc or a magnetic card.

What is claimed is:

1. A method of manufacturing a layered magnetic head having a head face and an inductive transducing system, the method comprising the steps of depositing a non-magnetic, insulating material for forming a first insulation layer on a substrate, depositing a non-magnetic, insulating material on the first insulation layer for forming a second insulation layer on the first insulation layer and forming an inductive transducing element thereon, forming a magnetic flux guide bounding a non-magnetic gap layer adjoining the basic surface forming the head face so that the flux guide and the gap layer terminate in the head face, and after the formation of the second insulation layer, removing material in a head in which the head face is formed, and forming an aperture extending through the first and the second insulation layer and reaching as far as the basic surface, depositing a non-magnetic, insulating material for forming the gap layer in the aperture, and depositing soft-magnetic material on the gap layer for forming a first soft-magnetic layer, planarizing the first soft-magnetic layer to form a plane surface on which a soft-magnetic material is subsequently deposited for forming a second soft-magnetic layer which, jointly with the first soft-magnetic layer, constitutes the magnetic flux guide.

2. A method as claimed in claim 1, wherein said method starts from a plane substrate of a non-magnetic material on which a soft-magnetic material is deposited for forming a soft-magnetic basic layer, whereafter the basic layer, as well as adjoining layer parts of deposited non-magnetic, insulating material, are planarized to form the basic surface.

3. A method as claimed in claim 2, further including the step of depositing a non-magnetic, insulating material for forming an insulating basic layer on the substrate prior to providing a soft-magnetic material on the substrate, forming an aperture corresponding to the soft-magnetic basic layer to be formed and reaching as far as the substrate in the insulating basic layer by removing material, the soft-magnetic basic layer by depositing a soft-magnetic material in the relevant aperture, and jointly planarizing the soft-magnetic basic layer and the insulating basic layer.

4. A method as claimed in claim 1 wherein the step of planarizing is effected by means of mechanochemical polishing.

5. The magnetic head resulting from the process of claim 1, wherein the magnetic head has a head face and comprises an inductive transducing system with an inductive transducing element embedded in an insulation layer present on a plane basic surface, and is provided with a flux guide present on the insulation layer and has an end part adjoining the head face, said end part comprising two soft-magnetic layers situated on top of each other and, jointly with the plane basic surface, bounds a non-magnetic gap layer.

6. The magnetic head resulting from the process of claim 5, comprising a magnetoresistive transducing system, in which the flux guide has a plane main surface on a side remote from the inductive transducing element, and a layer of the magnetoresistive transducing system is present on said plane main surface.

7. The magnetic head resulting from the process of claim 5, comprising a nonmagnetic substrate provided with a soft-magnetic basic layer having a plane basic surface.

8. A device for writing and/or reading information, provided with the magnetic head of claim 5, and having means for moving the magnetic head relative to a magnetic information medium.

9. A method as claimed in claim 1, wherein simultaneously with the removal of material from the first and the second insolation layer in an area proximate to the head face to be formed, material is removed from the first and the second insulation layer in an area remote from the head face to be formed, for forming a through-connection aperture extending as far as the basic surface, while, during the formation of the first soft-magnetic layer, a soft-magnetic material is deposited in the through-connection aperture for forming a soft-magnetic through-connection between the basic surface and the flux guide to be formed.

10. A method as claimed in claim 1, wherein the flux guide, as well as adjoining layer parts of deposited non-magnetic, insulating material are planarized to form a plane main surface on which subsequently a layer of a magnetoresistive transducing system is formed.

11. A method of manufacturing a layered magnetic head having a head face and comprising an inductive transducing system comprising the steps of depositing a non-magnetic, insulating material for forming a first insulation layer on a substrate, depositing a non-magnetic, insulating material on the first insulation layer for forming a second insulation layer on the first insulation layer and forming an inductive transducing element thereon, forming a magnetic flux guide bounding a non-magnetic gap layer forming the head face so that the flux guide and the gap layer terminate in the head face, and after the formation of the second insulation layer, removing material in head in which the head face is formed and forming an aperture extending through the first and the second insulation layer and reaching as far as the basic surface, depositing a soft-magnetic material in the aperture for forming a first soft-magnetic layer, planarizing the first soft-magnetic layer to form a plane surface on which a non-magnetic, insulating material is subsequently deposited for forming the gap layer, and depositing a soft-magnetic material for forming a second soft-magnetic layer constituting the magnetic flux guide.

12. The magnetic head resulting from the process of claim 11, said magnetic head having a head face and comprising an inductive transducing system provided with an inductive transducing element embedded in an insulation layer present on a plane basic surface and having a plane flux guide present on the insulation layer and terminating in the head face, said flux guide bounding a non-magnetic gap layer jointly with a soft-magnetic layer present on the basic surface.

13. A method of manufacturing a layered magnetic head having a head face and comprising an inductive transducing system comprising the steps of depositing a non-magnetic, insulating material for forming a first insulation layer on a substrate, depositing a nonmagnetic, insulating material for forming a second insulation layer, and forming the inductive transducing element thereon, forming a magnetic flux guide bounding a non-magnetic gap layer forming the head face so that the flux guide and the gap layer terminate in the head face, and prior to the formation of the first insulation layer depositing a soft-magnetic material on a basic surface in an area in which the head face is formed thereby forming a first soft-magnetic layer and on adjoining parts of the basic surface for forming the first insulation layer, consecutively forming the inductive transducing element and the second insulation layer and planarizing as far as the first soft-magnetic layer is effected for forming a plane surface on which a non-magnetic, insulating material for forming the gap layer and a soft-magnetic material for forming a second soft-magnetic layer constituting the flux guide are consecutively deposited.

* * * * *